(12) United States Patent
Naaktgeboren et al.

(10) Patent No.: US 6,179,092 B1
(45) Date of Patent: Jan. 30, 2001

(54) PARKING LOCK FOR AN AGRICULTURAL IMPLEMENT

(75) Inventors: Adrianus Naaktgeboren, Varsenare;
Danny Noël Oscar Claeys, Oedelem;
Freddy Albert Hindryckx, Oostende,
all of (BE)

(73) Assignee: New Holland North Ameria, Inc.,
New Holland, PA (US)

( * ) Notice: Under 35 U.S.C. 154(b), the term of this patent shall be extended for 0 days.

(21) Appl. No.: 09/437,598

(22) Filed: Nov. 10, 1999

(30) Foreign Application Priority Data

Nov. 19, 1998 (GB) ................................................. 9825276

(51) Int. Cl.$^7$ ............................. A01B 73/00; B60T 1/00; B60T 11/04
(52) U.S. Cl. ................................ 188/31; 188/69; 188/265
(58) Field of Search ................................ 188/31, 60, 69, 188/265, 112 R, 3 H, 3 R, 166, 167; 74/532; 56/11.3; 303/7

(56) References Cited

U.S. PATENT DOCUMENTS

| 39,581 | * | 8/1863 | Lee ........................................ 188/31 |
| 440,032 | * | 11/1890 | Herrington ............................ 188/31 |
| 1,263,444 | * | 4/1918 | Lipschitz et al. .................... 188/31 |
| 4,084,663 | * | 4/1978 | Haley .................................... 188/31 |
| 5,113,977 | * | 5/1992 | Ridings et al. ....................... 188/69 |
| 5,197,577 | * | 3/1993 | Hayek ................................... 188/265 |
| 5,238,298 | * | 8/1993 | Wagner et al. . | |
| 5,540,308 | * | 7/1996 | Wians ................................... 188/69 |
| 5,893,439 | * | 4/1999 | Park ....................................... 188/31 |

FOREIGN PATENT DOCUMENTS

| 1002456 | * | 5/2000 | (EP) . |
| 397521 | * | 8/1933 | (GB) . |
| 657801 | * | 2/1949 | (GB) . |
| 823372 | * | 2/1956 | (GB) . |
| 1295221 | * | 11/1972 | (GB) . |
| 1340880 | * | 12/1973 | (GB) . |
| 2048407 | * | 12/1980 | (GB) . |
| 2049076 | * | 12/1980 | (GB) . |
| 2165326 | * | 4/1986 | (GB) . |
| 2343924 | * | 5/2000 | (GB) . |

\* cited by examiner

*Primary Examiner*—Douglas C. Butler
(74) *Attorney, Agent, or Firm*—Larry W. Miller; J. William Stader

(57) ABSTRACT

A parking lock for an agricultural implement, such as a baler, includes a force accumulator mechanism operatively installed between a setting apparatus and a lock member. A control mechanism is operable to apply a force on the lock member in the direction of the release when the setting apparatus is held in its transport position and the lock member is retained in the hold position. The control mechanism is also operable to move the lock member to the release position whenever the setting apparatus is held in the transport position and the lock member is released. The force accumulator can be a spring positioned between the setting apparatus and the lock member. A method of method of releasing a parking lock on an agricultural implement is also provided by which the setting apparatus is moved from the park position to the transport position to load the force accumulator. At least one of the wheels of the implement is oscillated to take away the force applied by the wheel on the lock member so that the lock member can be moved from the hold position to the release position by the action of the force accumulator without requiring further input from the operator.

11 Claims, 2 Drawing Sheets

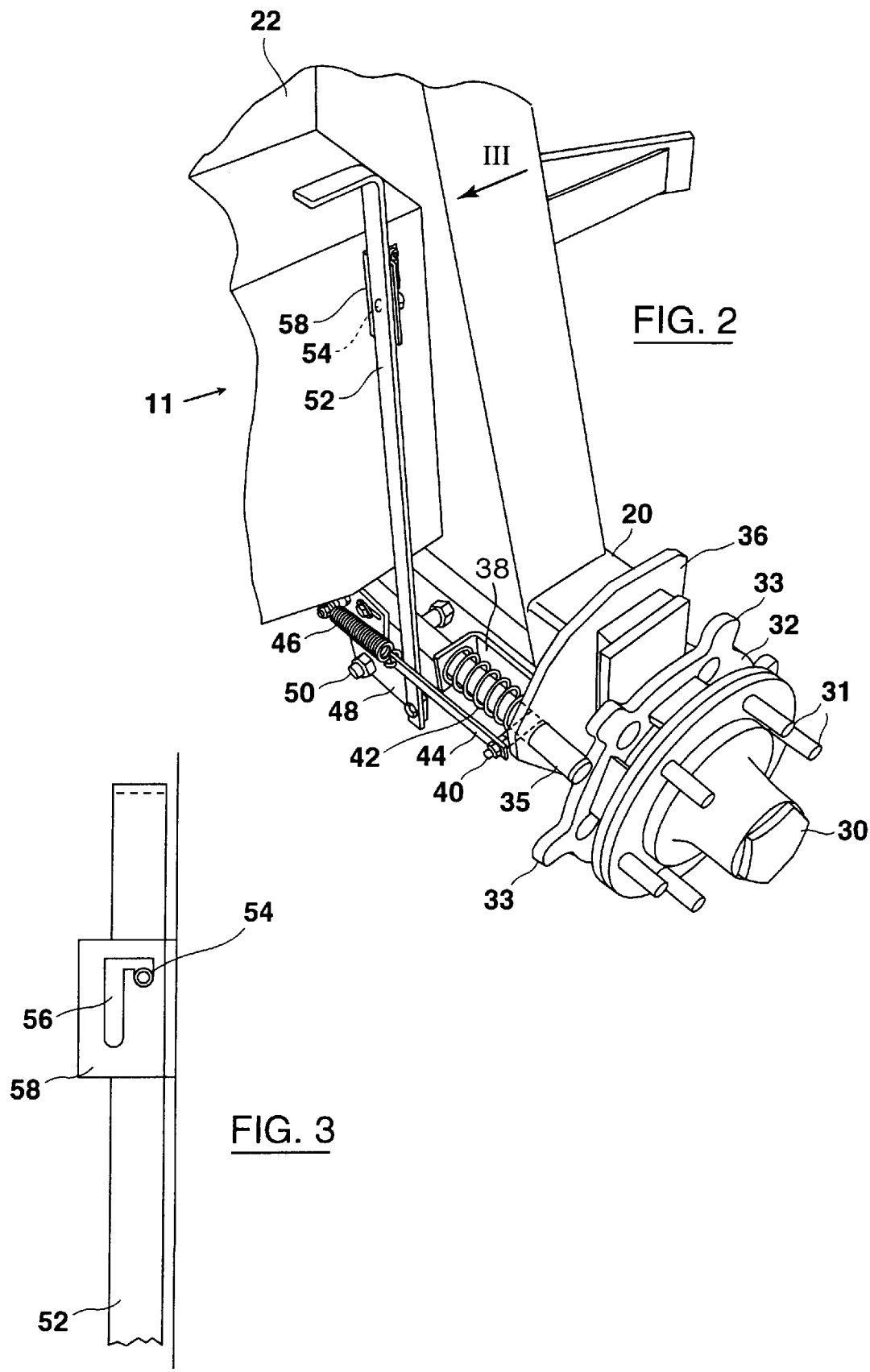

PARKING LOCK FOR AN AGRICULTURAL IMPLEMENT

BACKGROUND OF THE INVENTION

The present invention relates to agricultural implements and more particularly to a parking lock system for such implements. Such parking lock involves a positive brake system for securing the implement while parked, e.g. when the implement is uncoupled from the towing vehicle and left alone in the yard or on the field.

Many small agricultural implements are mounted on support wheels and are equipped with a towing bar for coupling the implement to a pulling vehicle such as a tractor. Because of the relatively small weight of the implement and the low maximum speed of the tractor, the road safety regulations do not always require to provide the implement with a wheel braking system which is coupled to braking system of the tractor and operated in conjunction therewith. The tractor has the necessary braking power to stop adequately both the tractor and the towed implement during road travel and field operations.

However when the implement is uncoupled and left to stand alone in the yard, on a public road or on the field, it may be necessary to provide extra means for securing the wheeled implement. It is well known in the art to use wedge blocks which can be installed in front of and/or behind one of the wheels to prevent the implement from running down a slope. It is also known to use a parking lock for securing one or both wheels to the frame of the implement. Commonly, the parking lock comprises a pin which can be inserted in a cavity of a circular member which is attached to the wheel or the wheel hub. Such apparatus is shown in GB 823.372. Herein a spring is provided for urging the pin into one of the cavities. For unlocking the wheel, a handle affixed to the pin is turned over along a ramp whereby the pin is lifted and pulled out of the cavity against the force of the spring. For locking the wheel the handle is turned in the other direction. The spring then forces the pin to the circular member and into one of the cavities.

It may happen that the border of the cavity is loaded so firmly against the pin, that a substantial force is needed to pull the pin out of the cavity. This occurs when the implement is parked on a slope or when the wheels got under stress by the maneuvers of the towing vehicle. If the pin cannot be pulled out manually, then it is a standard procedure to go back to the tractor, move the implement a little until the stress is off the wheel and then return to the implement for pulling out the pin. Such procedure is not very user-friendly and quite time-consuming.

Another known solution is to use a hydraulic or electrical actuator to remove the pin from the aperture. However such apparatus is relatively expensive, especially when compared to the full cost of the small implement it is used on.

SUMMARY OF THE INVENTION

Therefore it is an object of the present invention to remedy to the problems indicated above and to provide an agricultural implement equipped with reliable, yet simple and user-friendly means for blocking the wheels while the implement is parked and unblocking the same for further transport.

It is a feature of this invention to provide an agricultural implement with a control mechanism including a force accumulator device operatively installed between a setting mechanism and a lock member.

It is an advantage of this invention that the lock member is applied with a force in the direction of the release position while the setting mechanism is held in its transport position and the lock member is retained in the hold position.

It is another advantage of this invention that the lock member is moved to the release position when the setting mechanism is held in its transport position and the lock member is released.

It is another object of this invention that a method for releasing a parking lock means of an agricultural implement is provided.

It is another feature of this invention that the method of releasing a parking lock means includes the steps of:
  moving the setting mechanism from the park position to the transport position, thereby loading the force accumulator means;
  oscillating the at least one wheel or said frame for taking away the force applied by the at least one wheel on the lock member; and
  moving the lock member from the hold position to the release position under action of the force accumulator means, without further intervention of an operator.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 2 is an enlarged perspective view of one side of the frame of FIG. 1, after removal of on of the wheels, and showing a lever mechanism for locking the wheel; and FIG. 3 is a rear view of a portion of the lever mechanism taken in the direction of arrow III in FIG. 2.

DETAILED DESCRIPTION OF THE PREFERRED EMBODIMENT

Figure 1:
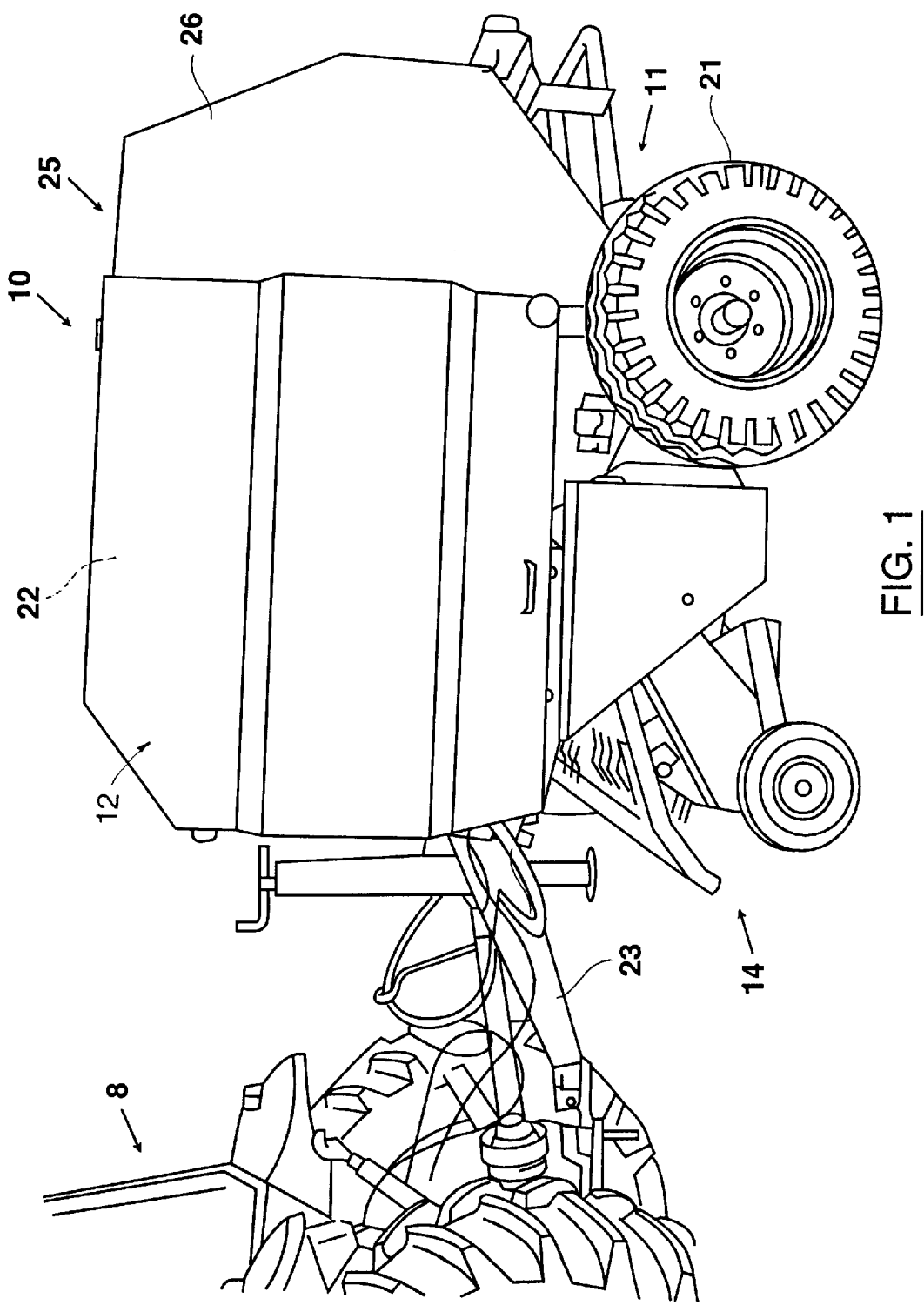
FIG. 1 is a side view of an agricultural baler attached to the rear of a tractor and comprising a frame supported on a pair of wheels.

The terms "front", "rear", "forward", "rearward", "left" and "right" used throughout this description are determined with respect to the normal direction of travel of the machine in operation. However, they are not to be construed as limiting terms.

Referring now to the drawings for a more detailed description of the invention, FIG. 1 shows the rear end of a towing vehicle, exemplified by a tractor 8, to which is attached a towed agricultural implement, in particular an agricultural baler 10. The baler 10 comprises a main frame 11, a bale forming chamber 12 mounted onto this frame 11 for forming a cylindrical package of crop material therein, a pick-up assembly 14 for picking up crop material, such as hay or straw, from the field and delivering it to a conveyor which feeds it into the bale forming chamber 12 while the baler 10 is towed across the field, and a wrapping apparatus (not shown) for wrapping material such as twine, plastic sheet or net around a completed cylindrical package within the bale forming chamber 12.

The main frame 11 includes a main support beam 20 to which a pair of ground-engaging wheels 21 (only one shown) is rotatably affixed. The frame 11 further includes a pair of side walls 22 between which the bale forming chamber 12 extends.

The baler 10 also includes attachment means, in particular a tongue 23, extending from the forward portion of the main frame 11 for connection of the baler 10 to the tractor 8. Pivotally connected to the side walls of the main frame 11 is a tailgate 25, which is closed during bale formation, as shown in FIG. 1, or pivoted open about stub shafts (not shown) to discharge a completed bale. The tailgate 25 includes tailgate walls 26 coextensive with the side walls 22.

FIG. 2 shows the area around the main support beam 20 after removal of the wheel 21. A hub 30 is rotatably mounted to the beam 20. The hub 30 is provided with a set of stud bolts 31 for attachment thereto of the wheel 21.

FIG. 2 also illustrates the means for locking the wheel 21 to the frame 11 and thereby preventing the further displacement of the baler 10. These means include a ring 32 attached to the inward face of the hub 30. The ring 32 has a series of radially extending protrusions 33 providing apertures in between into which a lock pin 35 can be inserted. The lock pin 35 is slidingly received in a hole in an end plate 36 of the beam 20 and a similar hole in an angled support plate 38 which is welded to the front face of the same beam. Between the angled end of the support plate 38 and the end plate 36 the lock pin 35 has a transverse hole through which a bolt 40 is inserted. A compression spring 42 is mounted over the lock pin 35 between the angled end of the support plate 38 and the bolt 40. The spring 42 urges the bolt 40 and the lock pin 35 outwardly to make the outer end of the latter assume a hold position in one of the apertures of the ring 32. To enable free rotation of the wheel 21, the lock pin 35 has to be pulled inwardly to a release position against the force of the spring 42.

The operator governs the position of the lock pin 35 by control means including a transversely extending pull rod 44 which is attached to the lock pin bolt 40. An inward force can be applied on the pull rod 44 and the lock pin 35 via a pull spring 46 which is mounted between the pull rod 44 and an arm of a lever 48. This lever has a pivot 50 which is fastened to the support beam 20. The other arm of the lever 48 is connected to the lower end of a handle 52, which can be moved up or down for tensioning or releasing the pull spring 46. The handle 52 has near its other end a guide pin 54 which is inserted in a guide track 56 provided in an angled plate 58 which is bolted onto the main frame 11. The track 56 has the shape of an inverted L and provides two rest positions for the handle 52: there is a lock position in which the handle is moved down and the pin 54 rests at the lower end of the vertical leg of the track 56 and a transport position in which the handle 52 is pulled up and the pin 54 rests at the end of the horizontal leg of the track 56.

When the handle 52 is in its lock position, the lever 48 is turned clockwise as seen in FIG. 2 and the tension on the pull spring 46 is released. The compression spring 42 is then able to push the lock pin 35 outwardly in the space between the protrusions 33. When the handle 52 is moved to its transport position, the pull spring 46 is loaded and the pin 35 is pulled inwardly against the force of compression spring 42. Therefore it is required that the spring constant of the pull spring 46 is greater than the spring constant of the compression spring 42.

When an operator wants to start using a parked implement he may first attach the tongue 23 of the baler 10 to the hitch of the tractor 8 and then set the handle 52 to its transport position as described above. The pull spring 46 is loaded and in case there is no substantial pressure by one of the protrusions 33 on the lock pin 35, the latter will be pulled inwardly to its release position, such that the baler 10 can be moved immediately by the tractor 8. However, in case there is a substantial load on the lock pin 35, the pull spring 46 will be stretched, but the pin 35 will remain seized in its hold position. The operator can now return to the tractor 8 and move the baler 10 a little rearwardly or forwardly, as the case may be, in order to remove the pressure of the protrusion 33 from the lock pin 35. A simple oscillation of the baler 10 would suffice. The released pin 35 is then retracted under action of the pull spring 46, setting the baler 10 free for further road or field travel. Thereby it is no longer needed that the operator return to the baler 10 for any further action on the handle 52.

For parking the baler 10, the operator sets the handle 52 to it lowest, park position, thereby removing the load from the pull spring 46. The compression spring 42 pushes the lock pin 35 outwardly and in case no protrusion 33 is present immediately in front of the pin 35, the latter assumes a position in between the protrusions 33, thereby preventing the further movement of the wheel 21. Otherwise, the tip of the lock pin 35 rests against a protrusion 33, but any small movement of the baler 10, e.g. while removing the tractor 8 from the baler 10, will rotate the ring 32 a little and provide the necessary room for the lock pin 35 to move outwardly and take a position in between the protrusions 33. In this manner the wheel 21 is locked to the frame 11.

While a preferred structure in which the principles of the present invention have been incorporated is shown and described above, it is to be understood that the invention is not to be limited to the particular details, as shown and described above, but that, in fact, widely different means may be employed in the practice of the broader aspects of the invention. For example, it is conceivable to use the locking means described above in other types of towed implement for agricultural use. In the embodiment described above the pull spring 46 is mounted between the lever 48 and the lock pin 35, but it is equally possible to provide the pull spring between the lever and the lower end of the handle. The ring 32 with its protrusions 33 may be replaced with a ring having a series of equally spaced circular holes for receiving the pin 35. Any of the springs 42, 46 may be replaced with other suitable resilient means, such as a gas spring. In the present embodiment the handle 52 was moved manually between the hold and the transport position, but it is also conceivable to use an actuator for changing the position of the control handle.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In an agricultural implement having a main frame; at least one pair of ground-engaging wheels rotatably attached to said frame; a mechanism for attaching said frame to a towing vehicle; and a mechanism for locking said wheels relative to said frame to prevent further movement of said implement, said locking mechanism including a lock member movable between a hold position in which said lock member precludes the rotation of at least one of said wheels and a release position in which said lock member permits rotation of said at least one wheel; control mechanism operatively linked to said lock member for moving said member between said hold position and said release position, said control mechanism including a setting apparatus movable between a park position for moving said lock member to said hold position and a transport position for moving said lock member to said release position, the improvement comprising:

said control mechanism further including a force accumulator mechanism operatively installed between said setting apparatus and said lock member, and said control mechanism being operable to apply on said lock member a force in the direction of the release position while said setting apparatus is held in its transport position and said lock member is retained in said hold position and said control mechanism further being operable to move said lock member to said release position when said setting apparatus is held in its transport position and said lock member is released.

2. The agricultural implement according to claim 1 wherein said force accumulator means comprise a resilient member installed between said setting apparatus and said lock member.

3. The agricultural implement of claim 2 wherein said setting apparatus include a handle for manually moving said setting apparatus between said park position and said transport position.

4. The agricultural implement of claim 3 wherein said setting apparatus include rest means for holding said handle in said transport position.

5. The agricultural implement of claim 4 wherein said handle is provided with a projection and said rest means include a guide track receiving said projection.

6. The agricultural implement of claim 5 wherein said control mechanism includes a further resilient means permanently applying on said lock member a force in the direction of said hold position, said force being smaller than the force applied by the force accumulator mechanism when said setting apparatus is held in its transport position and said lock member is retained is said hold position.

7. The agricultural implement of claim 6 wherein said further resilient means has a spring constant which is smaller than the spring constant of said resilient member.

8. The agricultural implement of claim 7 wherein said locking means include a ring member (32) attached to said at least one wheel (21) and provided with equally spaced apertures for insertion therein of said lock member.

9. The agricultural implement of claim 8 wherein said lock member (35) is movable between said hold position and said release position in a direction parallel to the axis of said at least one wheel (21).

10. A method for releasing a parking lock means of an agricultural implement including a main frame; at least one pair of ground-engaging wheels rotatably attached to said frame; means for attaching said frame to a towing vehicle; a lock member movable between a hold position in which said lock member precludes the rotation of at least one of said wheels and a release position in which said lock member does not preclude the rotation of said at least one wheel; setting apparatus movable between a park position for moving said lock member to said hold position and a transport position for moving said lock member to said release position; force accumulator means operatively installed between said setting apparatus and said lock member, and being operable to apply on said lock member a force in the direction of the release position while said setting apparatus is held in its transport position and said lock member is retained in said hold position and being operable to move said lock member to said release position when said setting apparatus is held in its transport position and said lock member is released, comprising the steps of:

moving said setting apparatus from said park position to said transport position, thereby loading said force accumulator means;

oscillating said at least one wheel or said frame for taking away the force applied by said at least one wheel on said lock member; and moving said lock member from said hold position to said release position under action of said force accumulator means, without further intervention of an operator.

11. The method of claim 10 wherein said oscillating step comprises oscillating said agricultural implement (10) by means of a towing vehicle.

* * * * *